UNITED STATES PATENT OFFICE.

JOHN R. MARTIN, OF COLUMBIA, TENNESSEE.

INSECTICIDE.

937,081.  Specification of Letters Patent.  Patented Oct. 19, 1909.

No Drawing.  Application filed December 14, 1908.  Serial No. 467,520.

*To all whom it may concern:*

Be it known that I, JOHN R. MARTIN, a citizen of the United States, residing at Columbia, in the county of Maury and State of Tennessee, have invented certain new and useful Improvements in Insecticides, of which the following is a specification.

This invention relates to insecticides.

One object of the invention is to provide a solution of certain chemicals compounded particularly to provide a fertilizer for fruit, forest and other trees, and also for the purpose of destroying vermin when the solution is sprayed thereon.

In compounding my preparation I first mix eight ounces of rosin with one-half ounce of paris green and one ounce of nitrate of potash. These ingredients may be mixed in a dried state, but preferably in the presence of water, say for instance one quart of water with each of the three ingredients. After mixing these ingredients I add thereto in the presence of a sufficient quantity of water, say for instance four gallons, eighteen ounces of carbolic acid, eighteen ounces of potassium arsenite, two ounces of sulfate of copper, and eight ounces of disulfid of carbon. The mixture is then thoroughly agitated in any suitable manner in the presence of the water to provide a finished preparation in liquid form, so that the preparation may be sprayed in any suitable manner on trees, particularly the roots thereof to provide a fertilizer, or be sprayed on any part of the tree, including the leaves thereof, for the purpose of destroying bugs or other insects. When the copper sulfate and potassium arsenite are mixed together, the copper is precipitated. The precipitate thus thrown down is copper arsenite. The mixture is not to be filtered, but is permitted to remain mixed.

What is claimed is:—

An insecticidal composition comprising rosin, paris green, copper arsenite, nitrate of potash, potassium arsenite, carbolic acid, disulfid of carbon and water in substantially the proportions specified.

In testimony whereof I affix my signature in presence of two witnesses.

JOHN R. MARTIN.

Witnesses:
 GEO. T. NEVILLE,
 NORMAN MARTIN.